United States Patent
Luo et al.

(10) Patent No.: US 12,266,364 B2
(45) Date of Patent: Apr. 1, 2025

(54) TASK INFORMATION MANAGEMENT

(71) Applicant: BEIJING BAIDU NETCOM SCIENCE TECHNOLOGY CO., LTD., Beijing (CN)

(72) Inventors: Sha Luo, Beijing (CN); Shihui Xu, Beijing (CN); Xiantao Chen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 350 days.

(21) Appl. No.: 17/812,651

(22) Filed: Jul. 14, 2022

(65) Prior Publication Data
US 2022/0358931 A1    Nov. 10, 2022

(30) Foreign Application Priority Data
Aug. 30, 2021 (CN) .......................... 202111008487.4

(51) Int. Cl.
*G10L 15/26* (2006.01)
*G10L 15/22* (2006.01)
(Continued)

(52) U.S. Cl.
CPC .............. *G10L 15/26* (2013.01); *G10L 15/22* (2013.01); *H04L 51/04* (2013.01); *H04L 51/043* (2013.01)

(58) Field of Classification Search
CPC ........ G10L 15/22; H04L 51/04; H04L 51/043
See application file for complete search history.

(56) References Cited

U.S. PATENT DOCUMENTS

| | | | | |
|---|---|---|---|---|
| 2003/0033585 A1* | 2/2003 | Sheets | .............. | G06Q 10/109 717/100 |
| 2003/0229670 A1* | 12/2003 | Beyda | .............. | G06Q 10/107 709/206 |

(Continued)

FOREIGN PATENT DOCUMENTS

| | | |
|---|---|---|
| CN | 108932159 A | 12/2018 |
| CN | 109005098 A | 12/2018 |

(Continued)

OTHER PUBLICATIONS

CN Appl. No. 202111008487.4, "Chinese Office Action", mailing date of Jun. 30, 2023, 8 pages.

(Continued)

*Primary Examiner* — Samuel G Neway
(74) *Attorney, Agent, or Firm* — FisherBroyles, LLP (57) ABSTRACT

A method and apparatus for task information management, an electronic device and a computer readable storage medium are provided, and the present disclosure relates to the technical field of computer application, in particular to the field of information processing. A specific implementation solution is: generating task information according to a selected instant message, making a task creation interface pop up, and filling with recognized task information for editing by a user; and hooking a generated task in a dialog box in a form of a shortcut after creating the task. The task is created according to the selected instant message, so that manual operations of the user can be greatly reduced, it is quite convenient, a complicated step of looking for an entrance to a task information management function is omitted, and it is more convenient and faster to use. Besides, the task is displayed in the dialog box in the form of a shortcut so that follow-up management of the task can be greatly convenient for the user. In this way, task information (Continued)

management is more efficient, and easier to popularize and apply.

20 Claims, 3 Drawing Sheets

(51) Int. Cl.
*H04L 51/04* (2022.01)
*H04L 51/043* (2022.01)

(56) References Cited

U.S. PATENT DOCUMENTS

| | | | | |
|---|---|---|---|---|
| 2005/0192030 | A1* | 9/2005 | Asthana | H04W 64/00 455/456.6 |
| 2007/0016873 | A1* | 1/2007 | Lindsay | G06F 3/0481 715/781 |
| 2007/0043720 | A1* | 2/2007 | Koenig | G06Q 30/02 |
| 2007/0282660 | A1 | 12/2007 | Forth | |
| 2015/0143258 | A1* | 5/2015 | Carolan | H04L 51/18 715/752 |
| 2017/0142036 | A1* | 5/2017 | Li | H04L 51/04 |
| 2017/0257331 | A1* | 9/2017 | Ohman | H04L 65/4015 |
| 2018/0067914 | A1* | 3/2018 | Chen | G06Q 10/063116 |
| 2018/0248998 | A1* | 8/2018 | Kim | H04M 1/724 |
| 2020/0059444 | A1* | 2/2020 | Liu | G06F 3/0481 |
| 2022/0358931 | A1* | 11/2022 | Luo | G10L 15/26 |

FOREIGN PATENT DOCUMENTS

| | | |
|---|---|---|
| CN | 110291759 A | 9/2019 |
| CN | 110535753 A | 12/2019 |
| CN | 111784297 A | 10/2020 |
| CN | 112580907 A | 3/2021 |
| CN | 113011841 A | 6/2021 |
| CN | 113285868 A | 8/2021 |
| EP | 3646205 A1 | 5/2020 |

OTHER PUBLICATIONS

First Office Action issued for counterpart CN application No. 202111008487.4, mailed Nov. 1, 2022, 8 pages.
EESR issued in counterpart EP application No. 22181646.5, mailed Dec. 9, 2022, 8 pages.

* cited by examiner

TASK INFORMATION MANAGEMENT

CROSS REFERENCE TO RELATED APPLICATIONS

This application claims priority to Chinese Patent Application No. 202111008487.4, filed on Aug. 30, 2021, the contents of which are hereby incorporated by reference in their entirety for all purposes.

TECHNICAL FIELD

The present disclosure relates to the field of information technique, in particular to a method and apparatus for task information management, an electronic device and a computer readable storage medium.

BACKGROUND

With increasing development and progress of computer and Internet technology, online office becomes a new trend, wherein task information management, e.g., creating task information in time, updating a task status, etc., is a quite important work.

However, in an existing online office product, an entrance to related functions, for example, "to-do items", of task information management is deeply concealed, and a user needs to know a nested relation of product functions very well to find the entrance to the related functions. Besides, the related functions of task information management are relatively independent and easily being forgotten due to lack of reminding and pushing of the functions, and the user needs to focus, update and follow through them on his own. Moreover, as it is inconvenient to use, the user prefers to make a call or text a message for communication, or communicate face to face offline for solution.

SUMMARY

The present disclosure provides a method and apparatus for task information management, a device and a storage medium.

According to an aspect of the present disclosure, a method for task information management is provided and includes: generating task information according to a selected first instant message in response to a first instruction for creating a task, displaying a task creation interface, and filling the task information into corresponding fields of the task creation interface for a user to edit; and creating the task according to values of respective fields in the task creation interface in response to a second instruction for confirming creation of the task, and hooking the task, as a shortcut, into a dialog box where the first instant message is located.

According to another aspect of the present disclosure, an apparatus for task information management is provided and includes: a task creation interface displaying module, configured to generate task information according to a selected first instant message in response to a first instruction for creating a task, display a task creation interface, and fill the task information into corresponding fields of the task creation interface for a user to edit; and a task shortcut hooking module, configured to create the task according to values of respective fields in the task creation interface in response to a second instruction for confirming creation of the task, and hooking the task, as a shortcut, into a dialog box where the first instant message is located.

According to another aspect of the present disclosure, an electronic device is provided and includes: at least one processor; and a memory in communication connection with the at least one processor; wherein the memory stores an instruction capable of being executed by the at least one processor, and the instruction is executed by the at least one processor so as to enable the at least one processor to execute any above method for task information management.

According to another aspect of the present disclosure, a non-transitory computer readable storage medium storing a computer instruction is provided, wherein the computer instruction is used for making a computer execute any above method for task information management.

According to another aspect of the present disclosure, a computer program product is provided and includes a computer program, and the computer program, when executed by a processor, implements any above method for task information management.

According to another aspect of the present disclosure, an instant messaging product is provided and includes a dialog box configured to send an instant message, and any above task information management method is executed in the dialog box.

It should be understood that contents described in this part are neither intended to indicate key or significant features of the embodiments of the present disclosure, nor used for limiting the scope of the present disclosure. Other features of the present disclosure will become easy to understand through the following specification.

BRIEF DESCRIPTION OF THE DRAWINGS

Accompanying drawings are used for better understanding the solution instead of limiting the present disclosure. Where.

DETAILED DESCRIPTION

Exemplary embodiments of the present disclosure are described with reference to the drawings, which includes various details of the embodiments of the present disclosure for better understanding and should be regarded as only exemplary. Therefore, those ordinarily skilled in the art should realize that various changes and modifications can be made to the embodiments described herein without departing from the scope and spirit of the present disclosure. Similarly, for the sake of being clear and concise, description for known functions and structures is omitted in the following description.

Figure 1:
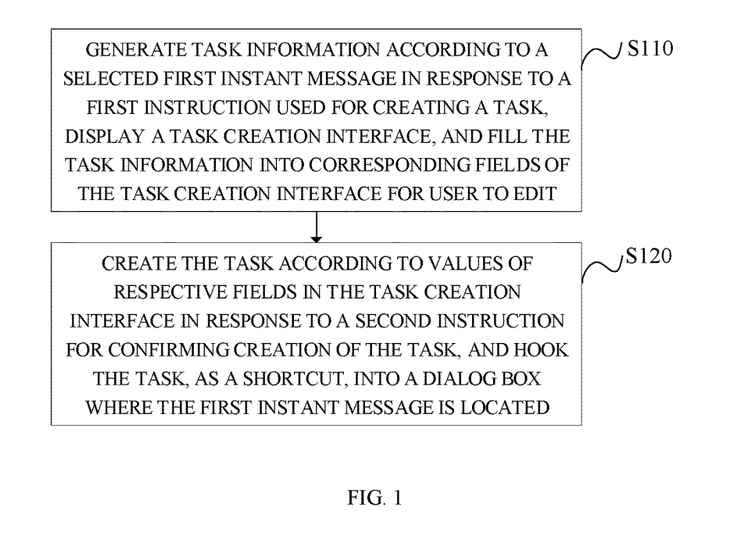
FIG. 1 is a schematic flowchart of a first embodiment of a method for task information management of the present disclosure.

FIG. 1 shows a flowchart of implementing a method for task information management of an embodiment of the present disclosure. Referring to FIG. 1, the method is applied to a dialog box of an instant message. Before the message is applied, a user already performs assignment of a task through an instant message and selects an instant message, namely a first instant message, for assignment of the task. The method includes that: in operation S110, task information is generated according to a selected first instant message in response to a first instruction for creating a task, a task creation interface is displayed, and the task information fills corresponding fields of the task creation interface for a user to edit; and in operation S120, the task is created according to values of respective fields in the task creation interface in response to a second instruction for confirming creation of the task, and the task is hooked, as a shortcut, into a dialog box where the first instant message is located.

The dialog box may be a single chat window involving only two users, or a group chat window involving two or more users.

The first instruction for creating the task may be an instruction sent in various modes, for example: double-click with a mouse; long press of a message; press down a certain shortcut functional key, for example, Alt+T; right click to select a menu item such as "creation of task" from a displayed function menu; selecting a menu item such as "creation of task" from a function menu of the dialog box, etc.

The task information includes: a task assignment person, a task executing person, a task content, a task time limit, etc.

The first instant message may be a text message, a voice message, or multimedia messages such as a picture.

If the first instant message is the text message, the above task information can be recognized from the message through keyword recognition, character searching and matching and other technologies. If the first instant message is the voice message, the above task information can be recognized from the voice message through a voice recognition technology, a semantic analysis technology and other technologies. If the first instant message is the picture, a text can be recognized from the picture through a picture recognition technology and the other technologies, and then the above task information can be obtained from the recognized text.

For the sake of convenient recognition, an expression manner of an instant message may be agreed, for example, example statements suitable for a specific manner can be provided for reference by the user; and a supported picture form is agreed (for example, only a screenshot of a task displaying interface of certain task systems can be supported), etc.

The recognized task information is usually a group of key value pairs, for example, "task assignment person: Zhang San; task executing person: Li Si", "task content: write a client evaluation report in July", "task time limit: August 7", etc.

After the task information is recognized, the task creation interface can be displayed and the recognized task information fills the corresponding fields in the interface. The task creation interface may be any suitable interactive interface used for displaying information needed for creating the task, for example, a floating window, a pop-up window, a dynamic Tab, a card control, etc.

The fields of the task creation interface usually correspond to keys in the recognized task information. For example, "task assignment person", "task executing person", "task content" and "task time limit" are also arranged in the task creation interface. In this way, "Zhang San" can be filled into "task assignment person", and "Li Si" can be filled into "task executing person", and so on.

As there is error in text recognition, voice recognition or picture recognition, a case of the recognized task information being inaccurate may occur, so after the task creation interface is displayed and the task information is displayed in the corresponding fields, check and modification can be made by the user, and the second instruction for confirming creation of the task is provided so that the task is created after the user makes confirmation. In this way, both convenience and accuracy of the creation of the task can be considered.

The second instruction for confirming creation of the task may be an instruction sent in various modes, for example, click a "confirm" button in the task creation interface; and press down a certain shortcut functional key, for example, Alt+C, etc.

Creation of the task refers to saving the value of respective field in the creation interface and forming a task record, and the task record may be saved in an independent task library or serves as a special chat record.

In another aspect, the task may establish an association relation with the dialog box where the first instant message is located, and is hooked, as a shortcut, into the dialog box. The shortcut may be a text link or a graphical control, and the interface of editing or displaying the task information can be conveniently opened.

The shortcut may be placed in any position of the dialog box, for example, a control column at the top or on one side.

Hooking refers to fixed connection between the task and the dialog box. Having this fixed connection relation, the shortcut may be always displayed in the dialog box, or concealed in a certain moment according to demands of the user and displayed in the dialog box again in another moment according to demands of the user.

Therefore, there is a possibility of real-time updating and following task in the dialog box, the dialog box is one of functions with the highest using frequency in online office and communication. Hooking into the dialog box enables the task information displaying interface or editing interface to be opened whenever possible, convenience of task information management can be greatly improved, and communication of a task status can be more efficient, and the task can be driven to be completed on time.

It needs to be noted that the embodiment shown in FIG. 1 is only a most basic embodiment of the method for task information management of the present disclosure, and an implementor can make further detailing and expanding on its basis.

The present disclosure provides the method and apparatus for task information management, the device and the storage medium. In the method, the task information is generated according to the selected instant message, the task creation interface pops up, the recognized task information fills for the user to edit; and after the task is created, the generated task is displayed in the dialog box as a shortcut.

The task is created according to the selected instant message, so that manual operation of the user can be greatly reduced, it is quite convenient, a complicated step of looking for an entrance to a task information management function is omitted, and it is more convenient and faster to use. Besides, the task is displayed in the dialog box as a shortcut, so that follow-up management of the task can be greatly convenient for the user. In this way, task information management is more efficient, and easier to popularize and apply.

Figure 2:
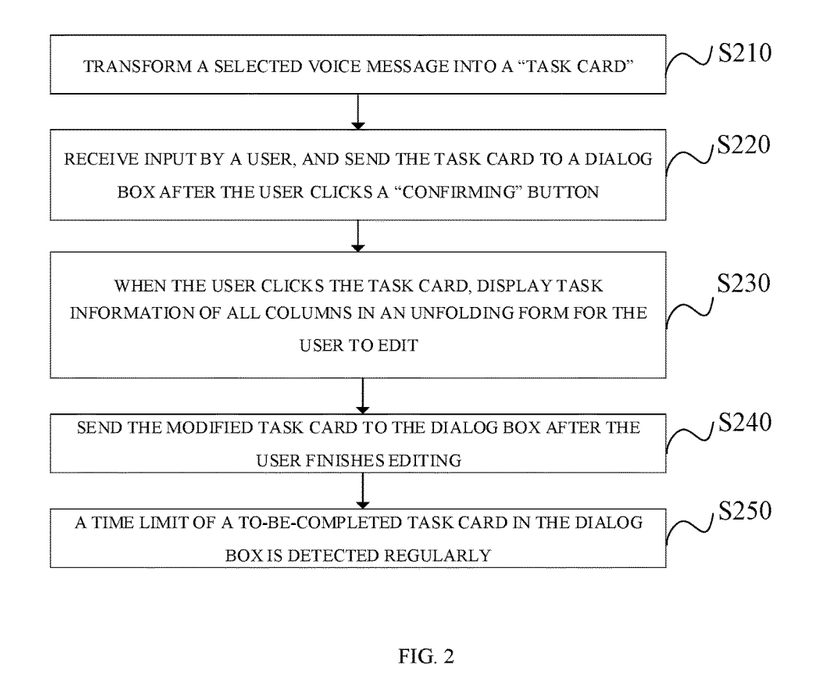
FIG. 2 is a schematic flowchart of a second embodiment of a method for task information management of the present disclosure.

FIG. 2 shows another embodiment of a method for task management of the present disclosure. In the embodiment, the first instant message includes the voice message, the voice message can be selected, and voice recognition is performed on the selected voice message to obtain the task information.

Input of the voice message is usually faster than input of the text message. Thus, the task can be created more quickly in the embodiment.

Referring to FIG. 2, operations for performing voice recognition on the selected voice message to obtain the task information, and managing on the task information include the following.

In operation S210, the selected voice message is transformed into "task card"; and in the dialog box, through an operation of long pressing the voice message, the voice message is subjected to voice recognition and translated, the task information is recognized from the voice message, and a new task card is established automatically on the basis of the task information.

When the task information is recognized from the voice message, the embodiment adopts a keyword extraction and recognition technology. Translation refers to transforming a voice recognition result into a text message. After the translated text information is obtained, key characters, words, short texts, etc. can be extracted therefrom, e.g., time, a person's name, a location, behavior description, etc., and are written into a corresponding column in the task card.

In the embodiment, the task card is a card control of the task creation interface, may serve as an instant message of a special form to be sent, and may also serve as part of a chat record to be saved in the dialog box after being sent.

In the dialog box, the task card has two displaying forms, one form is an unfolding form to display task information of all columns, and other form is a folding form to display only task summary information, for example, a task name, status and time limit.

When the task is created, it is displayed in the unfolding form, which is a specific form of the task creation interface, and the corresponding columns in the task card are equivalent to the corresponding fields in the above task creation interface.

In operation S220, input of the user is received, and the task card is sent to the dialog box after the user clicks the "confirm" button.

When the task card is sent to the dialog box, the task card is displayed in the folding form, at the moment, the task card also serves as a shortcut of the task to be hooked into the dialog box in a form of chat record. Accordingly, there is no need to arrange a region independently in a chat window for displaying the shortcut.

In order to find the task card in the chat record more quickly, a function such as "look for task card" may be further arranged in the menu for looking for the chat record so as to screen out the task card specially from the chat record.

In the embodiment, when displayed as the shortcut, the task card at least displays status information of the task, namely, a current status of the task, for example, "already started", "underway", "suspend", "resume", "almost due", "overdue", etc. In this way, the task status can be obtained more directly, task progress is easier to be acknowledged, and following of the task and impelling executing of the task are facilitated.

In operation S230, when the user clicks the task card, the task information of all the columns is displayed in the unfolding form for the user to edit; and when the user clicks the task card, the task card is transformed into the unfolding form to display the task information of all the columns; and the user can edit the task information in the columns. In the embodiment, the instruction provided for editing the task is "clicking" the task, and in other embodiments, any other suitable instruction may be also adopted, for example, using a shortcut key Alt+E, etc.

In operation S240, after the user finishes editing, the modified task card is sent to the dialog box; and after finishing editing of the task, the user can click the "confirm" button, the modified task card is sent to the dialog box so as to inform the user that the task has been already updated. In this way, the user associated with the task can know updating and change of the task immediately. In the embodiment, the instruction provided for confirming updating of the task is 'clicking' the task, and in other embodiments, any other suitable instruction may be also adopted, for example, using the shortcut key Alt+U, etc.

Besides, modified information, namely the updated content of the task, through editing by the user this time can be further detected, and the updated content of the task can serve as a text message to be sent to the dialog box, so that a receiving person can obtain the updated content of the task without opening the task card.

Besides, the task card may only be sent to the user, for example, a task initiator, a task assignment person, a task executing person, a task participant, etc., associated with the task in a mode of assigning the receiving person, for example, in a mode of @ a certain user. Therefore, interference with irrelevant persons in the dialog box is avoided.

In operation S250, a time limit of a to-be-completed task card in the dialog box is detected regularly, and if a duration from a current day to the due is shorter than or equal to 2 days, a reminding message is sent to the dialog box.

In the embodiment, task information to which each task card corresponds is saved in a task library, and the task library may be any suitable data storage system, for example, in a database, an LDAP server or a file system. When the user submits modification in the task card, the corresponding task information in the task library is also modified, and the task information in the task library may be related to a certain dialog box. Accordingly, the system can regularly detect a task time limit of non-completed tasks in the task library and compare it with a current date, if the duration from the current day to the due is shorted than or equal to 2 days, the reminding message is sent to the dialog box related to the task information so as to remind the user related to the task to take measures.

In this way, before the task is due, the user related to the task can be urged in time to take measures so as to guarantee that the task is completed in time.

Figure 3:
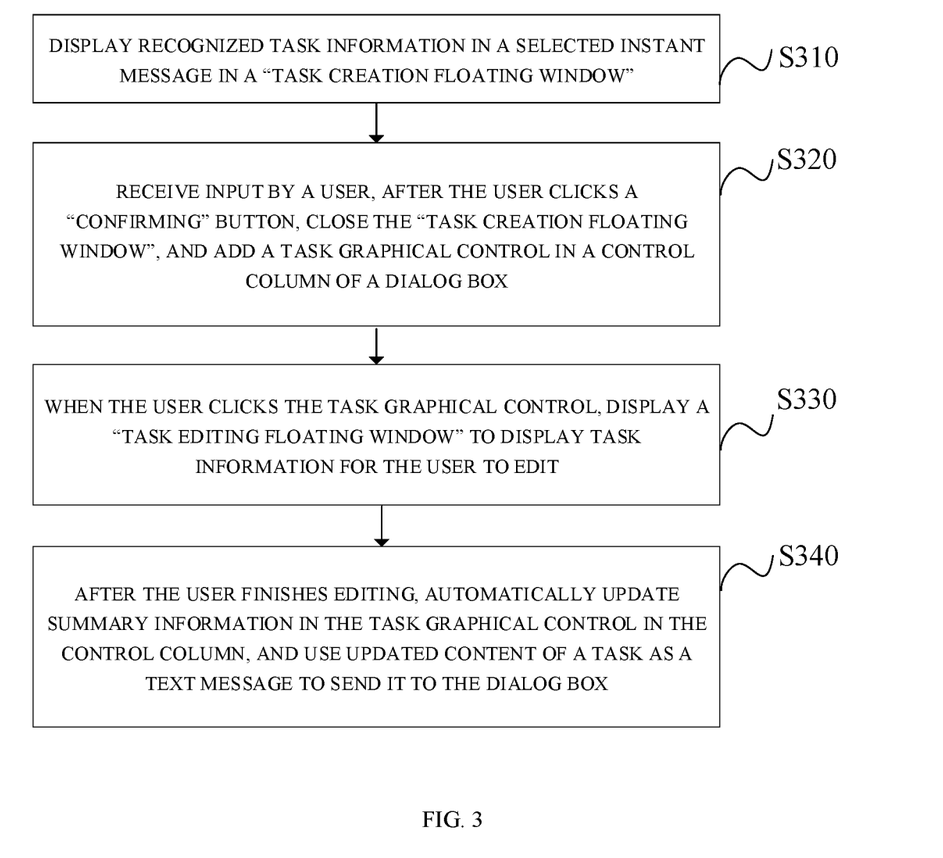
FIG. 3 is a schematic flowchart of a third embodiment of a method for task information management of the present disclosure.

FIG. 3 shows another embodiment of a method for task management of the present disclosure. Different from the embodiment shown in FIG. 2, in the embodiment, a task item graphical control is used as a shortcut of hooking the task into the dialog box. The task item graphical control is displayed in a control column in the dialog box. The control column is located at a top end of the dialog box in the embodiment, which can be displayed or folded as required. For example, it is displayed when a mouse moves to a top and is folded in other time. The implementor may also place the control column in any position of the dialog box in any suitable form.

The task card is displayed in the dialog box as a control of the control column, which is more intuitive and makes the task card easier to position and operate.

In the embodiment, operations of task information management through the instant message and the dialog box include the following.

In operation S310, the recognized task information in the selected instant message is displayed in a "task creation floating window"; and the task creation floating window is a floating window control and displays fields corresponding to the task information.

In operation S320, input by the user is received. After the user clicks the "confirming" button, the "task creation floating window" is closed, and a task graphical control is added into the control column of the dialog box; and the task graphical control is provided with a text displaying region, and summary information such as the name, status and time limit of the task will be displayed in the text displaying region.

In operation S330, when the user clicks the task graphical control, a "task editing floating window" is displayed so as to display the task information for the user to edit; and In operation S340, after the user finishes editing, the summary information in the task graphical control in the control column is automatically updated, and the updated content of the task is sent to the dialog box as a text message.

It needs to be noted that the embodiments shown in FIG. 2 and FIG. 3 are only exemplary description of the embodiments of the present disclosure without limiting suitable implementations or application scenes of the embodiments of the present disclosure, the implementor can adopt any suitable implementations to apply it to any suitable application scene according to specific implementation demands and implementation conditions.

Figure 4:
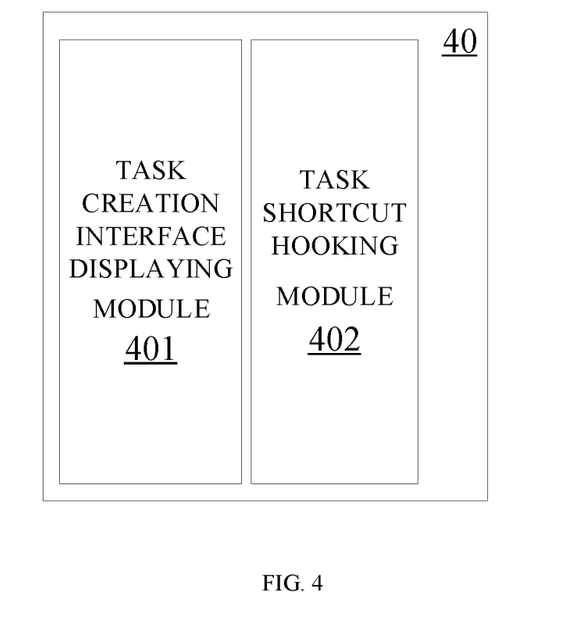
FIG. 4 is a schematic structural diagram of an embodiment of an apparatus for task information management of the present disclosure.

FIG. 4 shows a schematic structural diagram of an embodiment of an apparatus for task information management of the present disclosure. As shown in FIG. 4, the apparatus 40 includes: a task creation interface displaying module 401 configured to generate task information according to a selected first instant message in response to a first instruction for creating a task, display a task creation interface, and fill the task information into corresponding fields of the task creation interface for a user to edit; and a task shortcut hooking module 402 configured to create the task according to value of respective fields in the task creation interface in response to a second instruction for confirming creation of the task, and hook, as a shortcut, the task into a dialog box where the first instant message is located.

According to an implementation of the embodiment, the first instant message includes a voice message, correspondingly, the task creation interface displaying module 401 is configured to perform voice recognition on the selected voice message to obtain the task information.

According to an implementation of the embodiment, the apparatus 40 further includes: a task editing interface displaying module configured to display a task editing interface in response to a third instruction for editing the task, and display the task information corresponding to the task in respective field of the task editing interface for the user to edit; and a task updating module, configured to update the task according to a value of each field in the task editing interface in response to a fourth instruction for confirming updating of the task.

According to an implementation of the embodiment, the apparatus 40 further includes: a second instant message pushing module configured to push a second instant message into the dialog box so as to inform the user that the task has been already updated.

According to an implementation of the embodiment, the second instant message pushing module is configured to push the second instant message to the user, associated with the task, in the dialog box.

According to an implementation of the embodiment, the apparatus 40 further includes: a time limit detection module, configured to detect whether a duration between a current time and a preset time is shorter than or equal to a first time threshold, and if yes, push a third instant message into the dialog box so as to warn the user that there is a time limit for the task and the time limit is about to expire.

In the technical solution of the present disclosure, involved obtaining, saving and application, etc. of user personal information conform to regulations of relevant laws and regulations and do not violate public order and good morals.

According to an embodiment of the present disclosure, the present disclosure further provides an electronic device, including: at least one processor; and a memory in communication connection with the at least one processor. The memory stores an instruction capable of be executed by the at least one processor, and the instruction is executed by the at least one processor so as to enable the at least one processor to execute any above method for task information management.

According to an embodiment of the present disclosure, the present disclosure further provides a non-transitory computer readable storage medium storing a computer instruction, wherein the computer instruction is used for making a computer execute any above method for task information management.

According to an embodiment of the present disclosure, the present disclosure further provides a computer program product, including a computer program, and the computer program, when executed by the processor, implements any above method for task information management.

According to an embodiment of the present disclosure, the present disclosure further provides an instant messaging product, including a dialog box configured to send an instant message, and any above method for task information management is executed in the dialog box.

Figure 5:
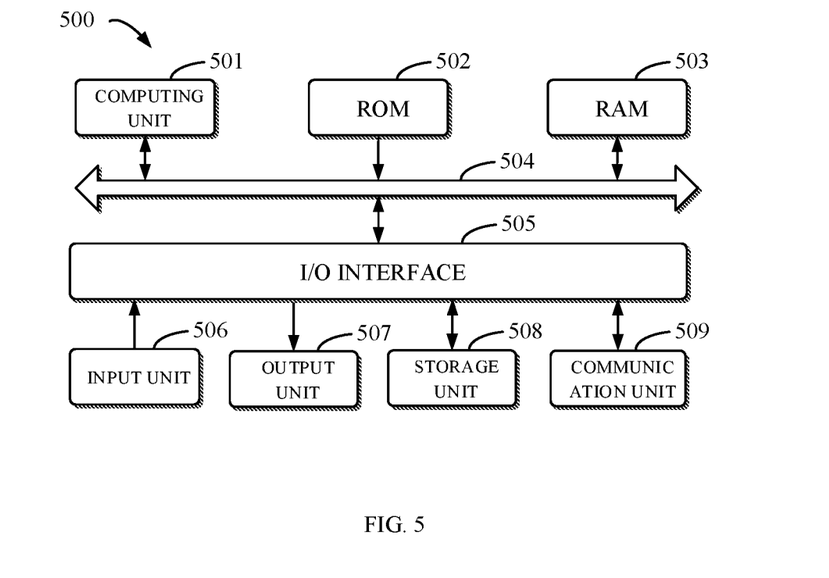
FIG. 5 is a block diagram of an electronic device for implementing an embodiment of a method for task information management of the present disclosure.

FIG. 5 shows a schematic block diagram of an exemplary electronic device 500 capable of implementing an embodiment of the present disclosure. The electronic device intends to represent various digital computers, such as a laptop computer, a desktop computer, a workbench, a personal digital assistant, a server, a blade server, a mainframe computer, and other suitable computers. The electronic device may also represent various movable apparatuses, such as personal digital assistant, a cellular phone, a smartphone, a wearable device and other similar computing apparatus. Components shown herein, their connections and relations and their functions are only examples and do not intend to limit implementation of the present disclosure described and/or required herein.

As shown in FIG. 5, the device 500 includes a computing unit 501, which can execute various appropriate actions and processing according to a computer program stored in a read-only memory (ROM) 502 or a computer program loaded from a storage unit 508 to a random access memory (RAM) 503. The RAM 503 can also store various programs and data needed by operations of the device 500. The computing unit 501, the ROM 502 and the RAM 503 are mutually connected through a bus 504. An input/output (I/O) interface 505 is also connected to the bus (504).

A plurality of components in the device 500 are connected to the I/O interface 505, including: an input unit 506, for example, a keyboard, a mouse, etc.; an output unit 507, for example, various displays, speakers, etc.; the storage unit 508, for example, a magnetic disk, an optical disk, etc.; and a communication unit 509, for example, a network card, a modem, a wireless communication transceiver, etc. The communication unit 509 allows the device 500 to exchange information/data with other devices via a computer network such the Internet and/or various telecommunication networks.

The computing unit 501 may be various general-purpose and/or special-purpose processing components with processing and computing capability. Some examples of the computing unit 501 include but are not limited to a central processing unit (CPU), a graphics processing unit (GPU), various special-purpose artificial intelligence (AI) computing chips, various computing units for running a machine learning model algorithm, a digital signal processor (DSP), and any suitable processor, controller, microcontroller, etc. The computing unit 501 executes each method and processing described above, for example, the method for task information management. For example, in some embodiments, the method for task information management may be realized as a computer software program, which is tangibly contained in a machine readable medium, for example, the storage unit 508. In some embodiments, a part of or all of the computer program may be loaded into and/or installed on the device 500 via the ROM 502 and/or the communication unit 509. When the computer program is loaded to the RAM 503 and executed by the computing unit 501, one or more steps of the method for task information management described above can be executed. Alternatively, in other embodiments, the computing unit 501 may be configured to execute the method for task information management in any other suitable mode (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a load programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally away from each other and usually interact via a communication network. A relation between the client and the server is generated by running the computer program with a mutual client-server relation on a corresponding computer. The server may be a cloud server or a server of a distributed system or a server combined with a block chain.

It should be understood that steps can be reordered, added or deleted by using various flows shown above. For example, all the steps recorded in the present disclosure can be executed in parallel or in sequence or in different sequences as long as an expected result of the technical solution of the present disclosure can be realized, which is not limited herein.

The above specific implementations do not constitute limit on the protection scope of the present disclosure. Those skilled in the art should understand that various modifications, combinations, sub-combinations and replacements can be made according to design requirements and other factors. Any of modifications, equivalent replacements and improvements and the like made within the spirit and principles of the present disclosure should fall within the protection scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for task information management, comprising:
   generating task information according to a selected first instant message in response to a first instruction for creating a task, displaying a task creation interface, and filling the task information into corresponding fields of the task creation interface for a user to edit;
   creating the task according to values of respective fields in the task creation interface in response to a second instruction for confirming creation of the task, and hooking the task, as a shortcut, into a dialog box where the first instant message is located; and
   detecting whether a duration between a current time and a preset time is shorter than or equal to a first time threshold, and if yes, pushing a third instant message into the dialog box so as to warn the user that there is a time limit for the task and the time limit is about to expire.

2. The method according to claim 1, wherein the first instant message comprises a voice message, and correspondingly, the generating task information according to a selected instant message comprises:
   performing voice recognition on a selected voice message to obtain the task information.

3. The method according to claim 1, further comprising:
   displaying a task editing interface in response to a third instruction for editing the task, and displaying task information corresponding to the task in respective fields of the task editing interface for the user to edit; and
   updating the task according to values of the respective fields in the task editing interface in response to a fourth instruction for confirming updating of the task.

4. The method according to claim 3, wherein after updating the task, the method further comprises:
   pushing a second instant message into the dialog box so as to inform the user that the task has already been updated.

5. The method according to claim 4, wherein the second instant message comprises updated content of the task.

6. The method according to claim 4, wherein the pushing a second instant message into the dialog box comprises:
   pushing a second instant message to a user who is associated with the task in the dialog box.

7. The method according to claim 1, wherein the shortcut displays status information of the task.

8. An electronic device, comprising:
   at least one processor; and
   a memory in communication connection with the at least one processor; wherein
   the memory stores instructions executable by the at least one processor, and the instructions are executed by the at least one processor so as to enable the at least one processor to:
   generate task information according to a selected first instant message in response to a first instruction for creating a task, display a task creation interface, and fill the task information into corresponding fields of the task creation interface for a user to edit;
   create the task according to values of respective fields in the task creation interface in response to a second instruction for confirming creation of the task, and hook the task, as a shortcut, into a dialog box where the first instant message is located; and
   detect whether a duration between a current time and a preset time is shorter than or equal to a first time threshold, and if yes, push a third instant message into the dialog box so as to warn the user that there is a time limit for the task and the time limit is about to expire.

9. The electronic device according to claim 8, wherein the first instant message comprises a voice message, and correspondingly, the instructions executed by the at least one processor so as to enable the at least one processor to generate task information according to a selected instant message comprise instructions to:
   perform voice recognition on a selected voice message to obtain the task information.

10. The electronic device according to claim 8, wherein the memory further stores instructions executed by the at least one processor so as to enable the at least one processor to:
    display a task editing interface in response to a third instruction for editing the task, and display task information corresponding to the task in respective fields of the task editing interface for the user to edit; and
    update the task according to values of the respective fields in the task editing interface in response to a fourth instruction for confirming updating of the task.

11. The electronic device according to claim 10, wherein the memory further stores instructions executed by the at least one processor so as to enable the at least one processor to:
    push a second instant message into the dialog box so as to inform the user that the task has already been updated after updating the task.

12. The electronic device according to claim 11, wherein the second instant message comprises updated content of the task.

13. The electronic device according to claim 11, wherein the instructions executed by the at least one processor so as to enable the at least one processor to push a second instant message into the dialog box comprise instructions to:
    push a second instant message to a user who is associated with the task in the dialog box.

14. The electronic device according to claim 8, wherein the shortcut displays status information of the task.

15. A non-transitory computer-readable storage medium storing instructions that, when executed by at least one processor, cause the at least one processor to perform operations comprising:
- generating task information according to a selected first instant message in response to a first instruction for creating a task, displaying a task creation interface, and filling the task information into corresponding fields of the task creation interface for a user to edit;
- creating the task according to values of respective fields in the task creation interface in response to a second instruction for confirming creation of the task, and hooking the task, as a shortcut, into a dialog box where the first instant message is located; and
- detecting whether a duration between a current time and a preset time is shorter than or equal to a first time threshold, and if yes, pushing a third instant message into the dialog box so as to warn the user that there is a time limit for the task and the time limit is about to expire.

16. The non-transitory computer-readable storage medium according to claim 15, wherein the first instant message comprises a voice message, and correspondingly, generating task information according to a selected instant message comprises:
- performing voice recognition on a selected voice message to obtain the task information.

17. The non-transitory computer-readable storage medium according to claim 15, wherein the operations further comprise:
- displaying a task editing interface in response to a third instruction for editing the task, and displaying task information corresponding to the task in respective fields of the task editing interface for the user to edit; and
- updating the task according to values of the respective fields in the task editing interface in response to a fourth instruction for confirming updating of the task.

18. The non-transitory computer-readable storage medium according to claim 17, wherein after updating the task, the operations further comprise:
- pushing a second instant message into the dialog box so as to inform the user that the task has already been updated.

19. The non-transitory computer-readable storage medium according to claim 18, wherein the second instant message comprises updated content of the task.

20. The non-transitory computer-readable storage medium according to claim 18, wherein the pushing a second instant message into the dialog box comprises:
- pushing a second instant message to a user who is associated with the task in the dialog box.

* * * * *